United States Patent Office 3,295,948
Patented Jan. 3, 1967

3,295,948
DESICCATION OF PLANTS WITH ACETYLENEDI-
CARBOXYLIC ACID COMPOUNDS
Herbert Q. Smith, Trenton, N.J., and Gopal H. Singhal, King of Prussia, Pa., assignors to Pennsalt Chemicals Corporation, Philadelphia, Pa., a corporation of Pennsylvania
No Drawing. Filed Apr. 30, 1964, Ser. No. 364,005
12 Claims. (Cl. 71—2.7)

The invention relates to the desiccation of plants and to compositions useful as desiccants. More particularly, the invention pertains to the use of acetylenedicarboxylic acid and its salts for desiccation and to chemical formulations containing acetylenedicarboxylic acid and its salts.

It is to be understood that the term "desiccation" as used in this discussion is meant to include also defoliant activity since the active agents of the invention function both to desiccate with or without foliar drop. When foliar drop occurs, defoliation is more descriptive of the action, but in any event, both desiccation and defoliation effects are achieved by this invention.

The desiccation plants and crops is of high economic importance in agricultural and forestry operations. Defoliation of plants is desirable to increase the value of crops from such plants either by hastening maturity and/or improving the grade of the fruit. In the case of cotton plants, for example, defoliation at the proper stage is highly desirable in order to expose the lower bolls, which, in luxuriant plants are inaccessible to sunlight which is needed for the maximum opening of the bolls. In addition, defoliation of the cotton plant leaves enables cotton picking to be made much more efficiently, either by hand or machine. Defoliation of cotton has additional advantages. For example, removal of the cotton plant leaves causes a reduction in the number of bolls, thereby reducing the food supply available to the boll weevil prior to its entering a state of hibernation. As a consequence, there is a reduction of the number of such pests which are able to live through the winter months and emerge to do subsequent damage. Also of economic importance is the defoliation of fruit trees, such as peach, citrus, apple, plum, etc., as well as other types of trees and shrubs. By such defoliation, the maturity of the plant or its fruit is forced and makes for more efficient production and/or growing. Also, by use of defoliation techniques nursery stock can be harvested earlier in the fall. Likewise, food plants, such as string beans, soya beans, and other vegetable crops are frequently subjected to defoliation in order to make harvesting easier and many seed crops are subject to desiccation to aid harvesting of seeds.

It has now been found in accord with this invention that the dessiccation of plants may be obtained by treating such plants with a dessiccative amount of a water soluble acetylenedicarboxylic acid compound; for example, a compound having the structure:

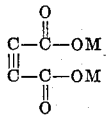

where M is a member of a group consisting of hydrogen, alkali metals, ammonium, and substituted ammonium. It will be understood that the active agents of this invention may be mono or di-salts and the salts need not necessarily be symmetrical (i.e. each M need not be identical).

The procedures that will be used to apply the acetylenedicarboxylic acid compounds to trees, vegetables and other crops for desiccation and defoliation purposes will be in accord with the usual practices. Since the active compositions have water solubility the compound will be employed as an aqueous solution. The preferred form of the acetylenedicarboxylic acid that will be used for desiccation is an aqueous solution of its free acid.

In a preferred embodiment of the invention, a concentrate of the active agent in water will be manufactured and sold as an article of commerce. Such a concentrate is simply diluted with additional water just prior to use to form an aqueous solution of the active agent at the desired concentration. This solution is readily sprayed on the foliage of the plants to be treated by any of the conventional techniques to be used for desiccation and defoliation. In general, a concentrate of the active agent in water will contain from about 5 to 50% by weight of the agent. In use, the concentrate will simply be mixed with additional water using agitation so that the concentration of active agent in the aqueous dispersion in the aqueous solution will be between about 0.1% and 30% by weight and this aqueous solution is immediately ready for application to the plant.

Alternatively, the active agent may be placed on a solid carrier rather than in the liquid carrier described above. Solid carriers may be applied directly to the plant by dusting, or they may be in the form of wettable or dispersible powders which likewise may be added to aqueous systems for application by conventional spray techniques. The concentration of the active agent on the carrier will likewise vary between about 5% and 20% by weight of the total composition.

Since the active compound is quite effective and may be used at concentrations which will range from about 0.5 to 2 lbs. per acre of crops treated, although in general the compound will be applied to crops at concentrations ranging from about 1 to about 10 lbs. per acre. The following examples are given to further illustrate the invention.

The acetylenedicarboxylic acids and their salts are known compounds which may be prepared in accord with the method disclosed by Organic Syntheses, coll. vol. II, page 10. The active compounds, as indicated, may be acetylenedicarboxylic acid itself and its mono- and di-salts. The alkali metal salts such as the mono- and disodium, potassium, lithium, cesium, and like salts, the mono- and di-ammonium lower alkylamine and quaternary ammonium salts are all active as desiccants. Of the amine salts, there may be used the methylammonium, diethylammonium, tri-n-butylammonium, tetramethylammonium, dimethylethylammonium, dimethyldiethylammonium and like salts. Also useful are the salts obtained form dimethyldodecylamine, dimethyloctadecylamine, dimethyltridecylamine and the like.

EXAMPLE 1

Plant response data were obtained by spraying formulations of the acetylenedicarboxylic acid and its salts on two-week old Black Valentine bean plants, at varous rates of application. Response effects observed over a three-week period are shown in the following table:

TABLE I.— DESICCANT AND DEFOLIANT ACTIVITY OF ACETYLENEDICARBOXYLIC ACID AND SALTS ON BLACK VALENTINE BEAN PLANTS

| Compound | Formulation | Activity | | | | | | | |
|---|---|---|---|---|---|---|---|---|---|
| | | Defoliation (Percent Abscission) | | | | Desiccation | | | |
| | | 1 lb./acre | | 10 lbs./acre | | 1 lb./acre | | 10 lbs./acre | |
| | | Percent | In days | Percent | In days | Percent | In days | Percent | In days |
| C—COOH ⫼ C—COOH | 10% by weight aqueous soln. | { 25 <br> { 100 | 7 <br> 14 | ---- | ---- | } 80–100 | 1 | 100 | 1 |
| C—COOK ⫼ C—COOH | 5% by weight aqueous soln. | 25 | 21 | 100 | 7 | 0–10 | 1 | 100 | 1 |

EXAMPLE 2

A 5% aqueous solution of disodium acetylenedicarboxylic acid prepared from 114 g. (1 mole) acetylenedicarboxylic acid and 80 g. (2 moles) of sodium hydroxide was applied to bean plants as above and resulted in slight desiccation and slow defoliation at 1.0 lb. per acre, and rapid desiccation at 10 lbs. per acre.

EXAMPLE 3

A 5% aqueous solution of bis(triethylammonium) acetylenedicarboxylate, prepared from one mole of acetylenedicarboxylic acid and two moles of triethylamine was applied to bean plants as in Example 1. Defoliation and desiccation was observed at both 10 lbs. per acre and 1 lb. per acre rates.

EXAMPLE 4

A 5% aqueous solution of bis(methylammonium) acetylenedicarboxylate, prepared from one mole of acetylenedicarboxylic acid and two moles of monomethylamine, gave rapid desiccation on bean plants at 10 lbs. per acre and showed moderate defoliation and desiccation effects at 1.0 lb. per acre.

EXAMPLE 5

A 7% aqueous solution of bis(tetramethylammonium) acetylenedicarboxylate, prepared from one mole of acethylenedicarboxylic acid and two moles of tetramethylammonium hydroxide, showed defoliation and desiccation effects when applied to bean plants at 10 and 1.0 lb. per acre as in Example 1.

EXAMPLE 6

A 3% aqueous solution of bis(dimethyldodecylammonium) acetylenedicarboxylate, prepared from one mole of acetylenedicarboxylic acid and two moles of dimethyldodecylamine, showed substantial desiccant and defoliant effects at 10 lbs. per acre and 1.0 lb. per acre when applied to bean plants as in Example 1.

When the compounds described above are used on the foliage of various other plants, such as soya beans, alfalfa, tomatoes, fruit trees and the like similar desiccant effects are observed.

It will be understood that numerous changes and variations may be made from the above description and examples without departing from the spirit and scope of the invention.

We claim:
1. A method for desiccating plants which comprises applying to the foliage of said plants a desiccating amount of a compound selected from the group of acetylenedicarboxylic acid and its water soluble salts.
2. A method for desiccating plants which comprises applying to the foliage of said plants a desiccating amount of a compound of structure:

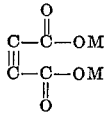

where M is a member of the group consisting of hydrogen, alkali metals, ammonium and substituted ammonium.
3. A method as in claim 2 wherein the active agent is acetylenedicarboxylic acid.
4. A method as in claim 2 wherein the active agent is an alkali metal salt of acetylenedicarboxylic acid.
5. A method as in claim 2 wherein the active agent is the disodium salt of acetylenedicarboxylic acid.
6. A method as in claim 2 wherein the active agent is the mono-potassium salt of acetylenedicarboxylic acid.
7. A method of claim 2 wherein the active agent is an ammonium salt of acetylenedicarboxylic acid.
8. A method as in claim 2 wherein the active agent is a substituted ammonium salt of acetylenedicarboxylic acid.
9. A method as in claim 2 wherein the active agent is bis(methylammonium) acetylenedicarboxylate.
10. A method as in claim 2 wherein the active agent is bis(triethylammonium) acetylenedicarboxylate.
11. A method as in claim 2 wherein the active agent is bis(tetramethylammonium) acetylenedicarboxylate.
12. A method as in claim 2 wherein the active agent is bis(dimethyldodecylammonium) acetylenedicarboxylate.

References Cited by the Examiner

UNITED STATES PATENTS 2,603,560   7/1952   Stewart _____ 71—2.7 X
2,931,754   4/1960   Baldridge _____ 71—2.7 X LEWIS GOTTS, *Primary Examiner.*

JAMES O. THOMAS, *Assistant Examiner.*